United States Patent
Binek et al.

(10) Patent No.: US 11,933,223 B2
(45) Date of Patent: Mar. 19, 2024

(54) INTEGRATED ADDITIVE FUEL INJECTORS FOR ATTRITABLE ENGINES

(71) Applicant: Raytheon Technologies Corporation, Farmington, CT (US)

(72) Inventors: Lawrence Binek, Glastonbury, CT (US); Matthew B. Kennedy, Vernon, CT (US); Jesse R. Boyer, Middletown, CT (US)

(73) Assignee: RTX CORPORATION, Farmington, CT (US)

( * ) Notice: Subject to any disclaimer, the term of this patent is extended or adjusted under 35 U.S.C. 154(b) by 124 days.

(21) Appl. No.: 16/388,206

(22) Filed: Apr. 18, 2019

(65) Prior Publication Data
US 2020/0332719 A1 Oct. 22, 2020

(51) Int. Cl.
*F02C 7/00* (2006.01)
*B22F 10/28* (2021.01)
*F02C 7/22* (2006.01)
*B22F 10/66* (2021.01)
*F23N 1/00* (2006.01)
*F23R 3/36* (2006.01)
*F23R 3/60* (2006.01)

(52) U.S. Cl.
CPC .............. *F02C 7/22* (2013.01); *B22F 10/28* (2021.01); *B22F 10/66* (2021.01); *F05D 2220/32* (2013.01); *F23N 1/00* (2013.01); *F23R 3/36* (2013.01); *F23R 3/60* (2013.01)

(58) Field of Classification Search
CPC .. F02C 7/22; F23R 2900/00018; F23R 3/283; F23R 3/54; F23R 3/002; F23R 3/60
See application file for complete search history.

(56) References Cited

U.S. PATENT DOCUMENTS

| 4,549,402 | A | * | 10/1985 | Saintsbury | F23R 3/28 60/738 |
| 4,920,740 | A | * | 5/1990 | Shekleton | F02C 7/26 60/790 |
| 5,033,263 | A | * | 7/1991 | Shekleton | F23R 3/06 60/800 |
| 5,088,287 | A | * | 2/1992 | Shekleton | F23R 3/343 60/740 |
| 5,101,634 | A | * | 4/1992 | Batakis | F23R 3/28 60/737 |

(Continued)

FOREIGN PATENT DOCUMENTS

| CN | 108590859 A | 9/2018 |
| WO | WO2017212211 A1 | 12/2017 |

OTHER PUBLICATIONS

Extended European Search Report for EP Application No. 20170299.0, dated Sep. 24, 2020, pp. 5.

*Primary Examiner* — Edwin Kang
(74) *Attorney, Agent, or Firm* — Getz Balich LLC

(57) ABSTRACT

An attritable engine includes an engine case, which includes an outer wall and a fuel rail integral with the outer wall. The fuel rail includes a fuel line integral with the outer wall, a fuel ring configured to receive fuel from the fuel line, and an injector throat configured to receive aerated fuel from the fuel ring. The engine case includes counter distortion webbing defining the injector throat and is integral with the fuel rail and the outer wall. The engine case includes a combustion chamber configured to receive fuel from the injector throat.

10 Claims, 3 Drawing Sheets

(56) References Cited

U.S. PATENT DOCUMENTS

| | | | | |
|---|---|---|---|---|
| 5,573,395 A * | 11/1996 | Althaus | F23D 23/00 | 431/278 |
| 5,749,218 A * | 5/1998 | Cromer | B23P 6/002 | 60/740 |
| 6,931,862 B2 | 8/2005 | Harris | | |
| 6,942,451 B1 | 9/2005 | Alexander et al. | | |
| 7,194,866 B1 | 3/2007 | Jones et al. | | |
| 7,797,922 B2 | 9/2010 | Eleftheriou et al. | | |
| 8,393,154 B2 | 3/2013 | Gandza | | |
| 9,062,609 B2 | 6/2015 | Mehring et al. | | |
| 9,086,033 B2 | 7/2015 | Dushku et al. | | |
| 9,791,153 B2 | 10/2017 | Dai et al. | | |
| 9,810,186 B2 | 11/2017 | Mansour et al. | | |
| 2002/0174657 A1 * | 11/2002 | Rice | F23R 3/12 | 60/746 |
| 2009/0133404 A1 * | 5/2009 | Lai | F01D 9/023 | 60/754 |
| 2009/0214331 A1 * | 8/2009 | Jewess | F01D 5/023 | 415/198.1 |
| 2009/0314000 A1 * | 12/2009 | Evulet | F23R 3/343 | 60/737 |
| 2010/0115966 A1 * | 5/2010 | Nagai | F23R 3/34 | 60/800 |
| 2010/0257864 A1 * | 10/2010 | Prociw | F23R 3/54 | 60/758 |
| 2011/0265491 A1 * | 11/2011 | Nakamura | F01D 9/023 | 60/734 |
| 2011/0271684 A1 * | 11/2011 | Corsmeier | F23R 3/42 | 60/753 |
| 2013/0174562 A1 * | 7/2013 | Holcomb | F23R 3/002 | 60/752 |
| 2013/0232980 A1 * | 9/2013 | Chen | F23R 3/045 | 60/754 |
| 2013/0283801 A1 * | 10/2013 | Romig | F23R 3/346 | 60/733 |
| 2014/0102112 A1 * | 4/2014 | Jewess | F01D 15/10 | 60/776 |
| 2014/0109581 A1 * | 4/2014 | Dudebout | F23R 3/16 | 60/754 |
| 2014/0216043 A1 * | 8/2014 | Cai | F23R 3/002 | 60/755 |
| 2014/0260304 A1 * | 9/2014 | Cummings, III | C10L 1/328 | 60/734 |
| 2014/0291418 A1 | 10/2014 | Ruffing et al. | | |
| 2014/0311152 A1 * | 10/2014 | Prociw | F02C 3/145 | 60/753 |
| 2014/0314548 A1 * | 10/2014 | Rivers | F01D 17/105 | 29/889 |
| 2015/0360287 A1 * | 12/2015 | Zink | F23D 11/38 | 419/28 |
| 2015/0361889 A1 * | 12/2015 | Maurer | F02C 3/04 | 60/755 |
| 2016/0003158 A1 | 1/2016 | Ott et al. | | |
| 2016/0290164 A1 | 10/2016 | Liebl et al. | | |
| 2016/0376997 A1 * | 12/2016 | Prociw | F23D 11/107 | 60/739 |
| 2017/0008086 A1 * | 1/2017 | Jones | B22F 5/009 | |
| 2017/0030219 A1 * | 2/2017 | Fleuriot | F01D 25/12 | |
| 2017/0227222 A1 * | 8/2017 | Baumgartner | F02C 7/18 | |
| 2017/0298829 A1 * | 10/2017 | Ozem | F23D 11/383 | |
| 2018/0128490 A1 * | 5/2018 | Boardman | F23R 3/283 | |
| 2018/0187894 A1 * | 7/2018 | Cai | F23D 14/64 | |

* cited by examiner

INTEGRATED ADDITIVE FUEL INJECTORS FOR ATTRITABLE ENGINES

BACKGROUND

The present disclosure relates generally to attritable aircraft engines. More specifically, this disclosure relates to a fluid dispensing system within an attritable aircraft engine.

Flow control for fluid dispensing apparatuses such as fuel injectors for gas turbine engines require many operating parts. Manufacturing of such fluid dispensing apparatuses require many operating sub-systems and many individual parts that must be assembled. In many instances there are more than 30 individual parts that require manufacturing and assembly, which is expensive and time consuming. Further, known fluid dispensing apparatuses may be heavy, are difficult to package, and because of the many operating parts may be expensive to maintain and/or repair. There exist needs in various industries to reduce the number of manufactured parts for fluid dispensing apparatuses, thereby providing more robust and simpler designs, which requires less maintenance, reduces manufacturing time and costs, reduces weight, and simplifies packaging.

SUMMARY

An additively manufactured attritable engine includes an engine case, which includes an outer wall and a fuel rail integral with the outer wall. The fuel rail includes a fuel line integral with the outer wall, a fuel ring configured to receive fuel from the fuel line, and an injector throat configured to receive aerated fuel from the fuel ring. The engine case includes counter distortion webbing defining the injector throat and is integral with the fuel rail and the outer wall. The engine case includes a combustion chamber configured to receive fuel from the injector throat.

A method of additively manufacturing an attritable engine includes defining an engine case and fuel rail geometry. The engine case includes an outer wall and a fuel rail integral with the outer wall. The fuel rail includes a fuel line integral with the outer wall, a fuel ring configured to receive fuel from the fuel line, and an injector throat configured to receive fuel from the fuel ring. The engine case includes a counter distortion webbing defining the injector throat and integral with the fuel rail and the outer wall and a combustion chamber configured to receive fuel from the injector throat. The method includes using a distortion modelled geometry to define the counter distortion webbing, using the engine case geometry, the fuel rail geometry, and the counter distortion webbing geometry to determine a tool path for additively manufacturing the engine case, and additively manufacturing the engine case with the counter distortion webbing, using the determined tool path.

The present summary is provided only by way of example, and not limitation. Other aspects of the present disclosure will be appreciated in view of the entirety of the present disclosure, including the entire text, claims, and accompanying figures.

DETAILED DESCRIPTION

Attritable aircraft can include, for example, Unpiloted (or Unmanned) Aerial Vehicles (UAVs) and expendable turbojet systems for guided munitions, missiles, and decoys. Attritable aircraft are generally designed as a limited lifetime vehicle, which can be as short as a single use or single mission vehicle. As such, many components and features common in traditional piloted aircraft are unnecessary, such as, a fuel dispensing system within a traditional aircraft engine, which can have more than 30 individual parts, each requiring assembly. Even in the realm of attritable engines, conventional fuel rails can have more than 10 individual parts, which need to be brazed together.

An attritable engine with an integrally built fuel dispensing system is disclosed herein. The attritable engine leverages additive manufacturing techniques to improve various aspects of the limited-life engine. For example, additive manufacturing allows the assembly details to be unitized and, simultaneously permits integration of many complex performance-enhancing features. The additively manufactured engine reduces the time to delivery to the customer and lowers the overall production costs of the unit.

Figure 1:
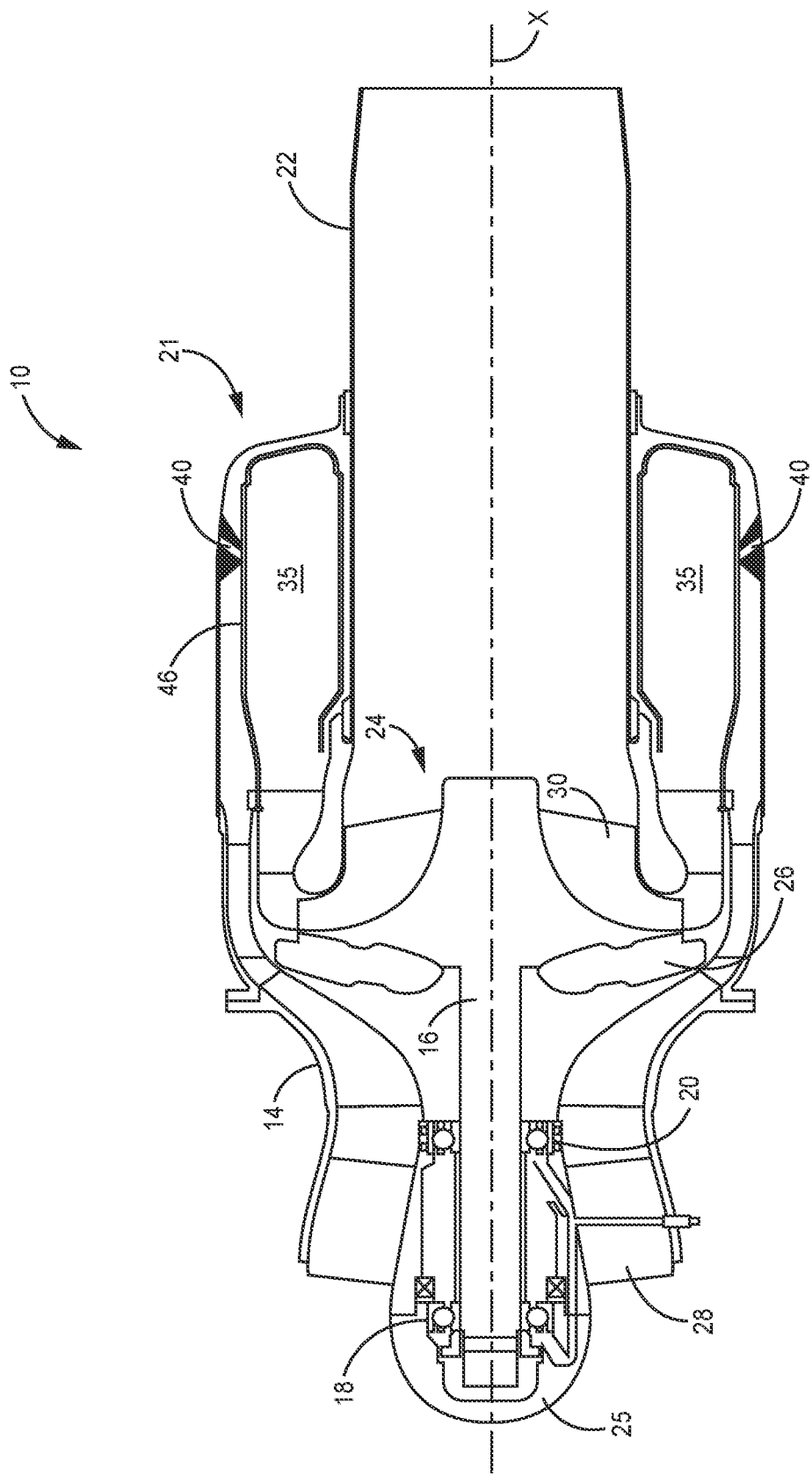
FIG. 1 is a cross-sectional view of a first attritable engine.

FIG. 1 is a cross-sectional view of attritable engine 10. FIG. 1 shows attritable engine 10 including forward housing 14, rotor shaft 16 rotationally mounted to forward bearing 18 and aft bearing 20, combustion system 21 and exhaust pipe 22. Combustion system 21 includes combustion chamber 35, injector throat 40, and combustion liner 46. Rotor shaft 16 rotates about longitudinal axis X, although other forms of rotors are also possible.

Attritable engine 10 also includes rotor system 24 with compressor blades 26 facing forward toward inlet 28 and turbine blades 30 facing rearward toward exhaust pipe 22 to define a turbine wheel. The forwardly extending shaft 16 is received in bearings 18 and 20 and is preferably coupled to forward cover 25.

Figure 2:
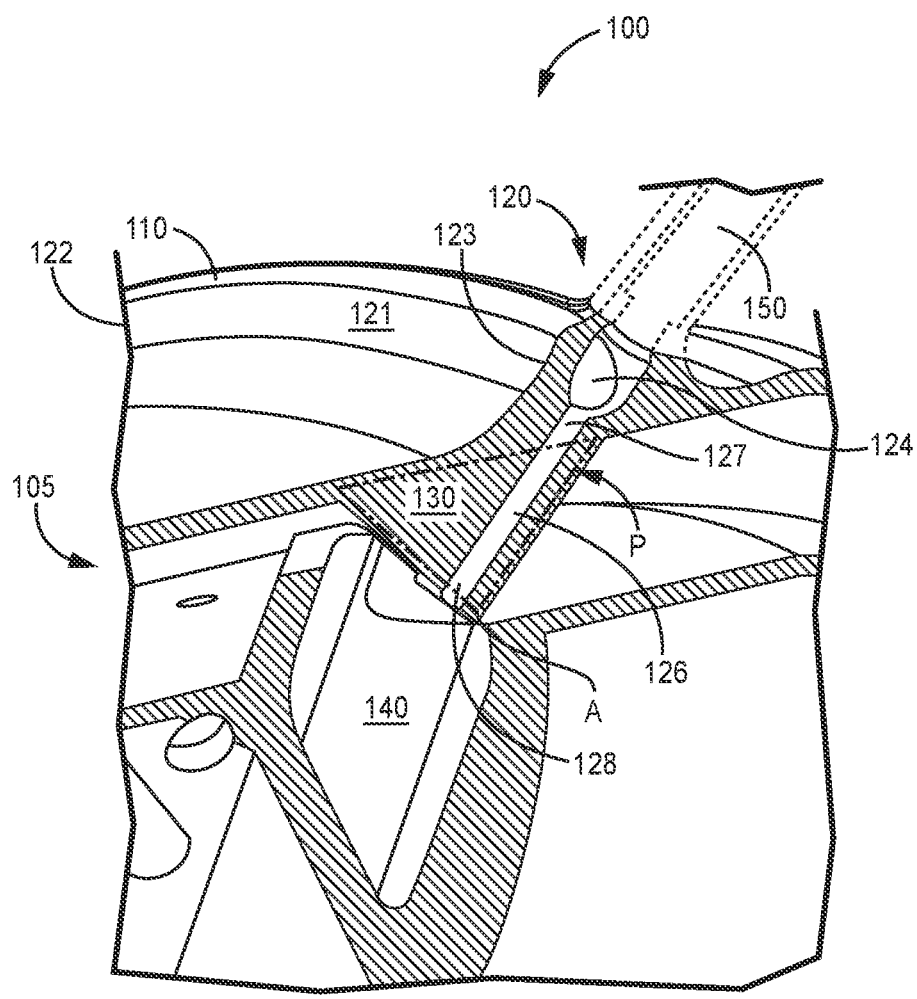
FIG. 2 is a cross-sectional view of a second attritable engine.

FIG. 2 is a cross-sectional view of attritable engine 100. FIG. 2 shows attritable engine 100 including engine case 105, outer wall 110, interior surface 112, exterior surface 114, fuel rail 120, fuel line 121, first end 122, second end 123, fuel ring 124, injector throat 126, injector throat inlet 127, injector throat outlet 128, counter distortion webbing 130, combustion chamber 140, and access port 150.

Attritable engine 100 has engine case 105, which includes outer wall 110 with interior surface 112 and exterior surface 114. Engine case 105 also has fuel rail 120, which includes fuel line 121 having a first end 122 and a second end 123, fuel ring 124, and injector throat 126. Interior surface 112 of outer wall 110 includes a cavity that defines fuel line 121 of fuel rail 120. Fuel line 121 is integral and conformal with outer wall 110. Fuel line 121 is configured to receive fuel from a fuel source at first end 122 and fuel line 121 is attached to fuel ring 124 at second end 123. Attritable engine 100 has a central rotor (not shown in FIG. 2). Outer wall 110 circumferentially surrounds the central rotor along its rotational axis.

Injector throat 126 is attached to fuel ring 124 at injector throat inlet 127 and can form a "T-junction" along with fuel line 121 and an air line (not shown in FIG. 2). Injector throat 126 extends at an acute angle from outer wall 110 in an axial direction and toward the central rotor's rotational axis. Injector throat 126 extends through and is defined by counter distortion webbing 130, which is integral and conformal with outer wall 110. Injector throat outlet 128 of injector throat 126 is configured to deliver aerated fuel to combustion chamber 140.

Attritable engine 100 is built using additive manufacturing techniques and has fuel distribution system manufactured integral with engine case 105. Specifically, counter distortion webbing 130 is built up in a layer-by-layer process on top of outer wall 110 in an axial direction and toward the central rotor's rotational axis and has a cavity, which defines injector throat 126. The additively manufactured counter distortion webbing 130 results in a geometry for injector throat 126 that meets the stringent tolerance requirements of attritable engine 100 without additional processing. Counter distortion webbing 130 can approximate a conical pyramid in shape (such as conical pyramid P with apex A, as outlined in FIG. 2) with the apex extending toward the central rotor's rotational axis.

Engine case 105 can optionally include access port 150, which can be used during the finishing phase of the manufacturing process to accurately and precisely define the geometry of injector throat 126 after it has been built using additive manufacturing techniques. Access port 150 can extend at the same acute angle through outer wall 110 as the acute angle injector throat 126 extends from outer wall 110. For example, a machining tool can enter access port 150, a line-of-sight feature, and can modify injector throat 126 using traditional subtractive manufacturing techniques, such as drilling, grinding, and polishing to meet the stringent tolerance requirements of attritable engine 100.

Fluid distribution system of attritable engine 100 operates by fuel entering first end 122 of fuel line 121 from a fuel source. The fuel travels through fuel line 121 and exits fuel line 121 at second end 123 and then enters fuel ring 124. The fuel can be partially aerated in fuel ring 124. For example, fuel ring 124 can have numerous holes where air may enter and mix with the fuel. The fuel, which can be aerated, then enters injector throat inlet 127 of injector throat 126. Fuel line 121 and injector throat 126 together with an air line (not shown in FIG. 2) at fuel ring 124 can form a "T-junction." The fuel travels through injector throat 126 and exits out of injector throat outlet 128. The fuel then enters combustion chamber 140 where it can be further aerated and is combusted.

Combustion chamber 140 can be adjacent to an air flow channel, which can provide cooling air to the exterior surface of combustion chamber 140. The air flow channel may be configured to operate in a traditional flow manner or the air flow channel may be configured to operate in a counter flow manner.

Attritable engine 100 can be additively manufactured using any metal or alloy that can tolerate the high temperature and pressure environment of an aircraft combustion engine for the expected useable life of the vehicle, such as, for example, Inconel 625. However, guided munitions, missiles, and decoys are designed as single use vehicles and can have a maximum useable life of 10 hours. Heat protection that extends the useable life of the vehicle beyond 10 hours can unnecessarily add labor and expense to the manufacturing of such an engine. On the other hand, some UAVs can be designed to perform multiple missions and more heat protection may be desirable. A specific metal or alloy with or without additional treatments to provide heat protection can be chosen with such considerations in mind. For example, a thermal barrier layer or coating can be applied to the metal or alloy to extend the useful life of the attritable engine.

Figure 3:
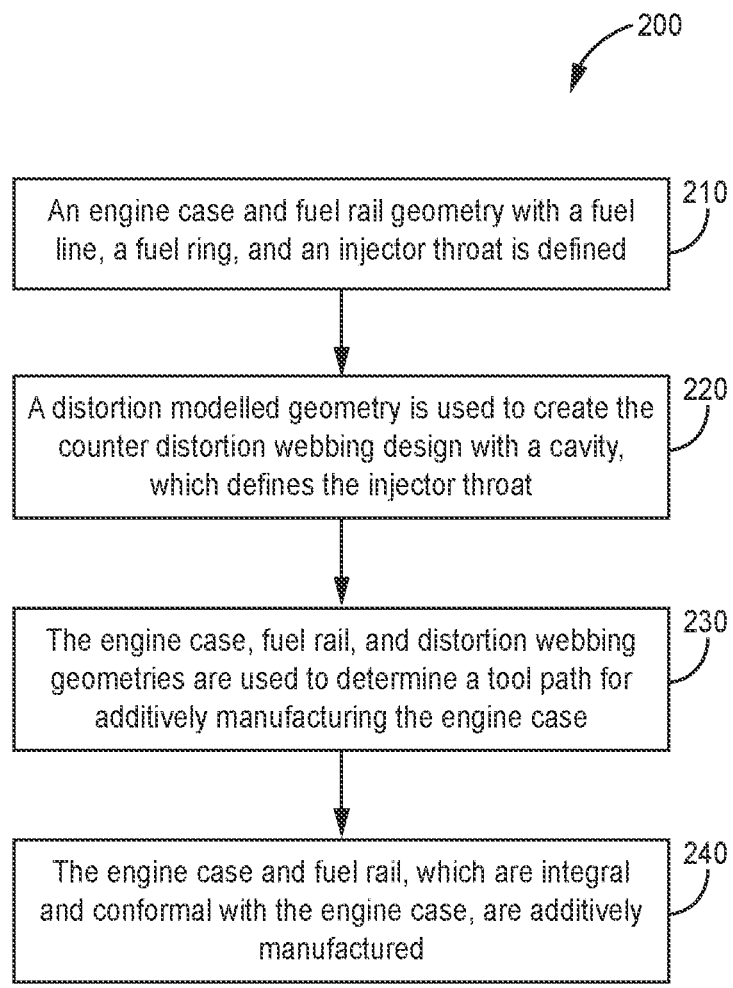
FIG. 3 is a process for manufacturing an attritable engine.
While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

FIG. 3 is a process for manufacturing an attritable engine. FIG. 3 shows process 200 including steps 210, 220, 230, and 240.

In step 210, an engine case geometry and fuel rail geometry are defined. The fuel rail geometry includes geometries for the fuel line, fuel ring, and injector throat. The injector throat geometry has an especially tight tolerance range. Even slight deviations from the tight tolerance range can dramatically affect the ability of the fuel dispensing system to deliver the appropriate amount of fuel for efficient combustion. The overall payload of the vehicle is also considered when defining the engine case and fuel rail geometries. For example, a missile or UAV can be much smaller and lighter compared to a traditional piloted aircraft. As such, the attritable engine length, measured from the primary air inlet to the primary air exhaust port, can be from 8 in. to 36 in. in length. The attritable engine length can be from 10 in. to 24 in. in length. The attritable engine length can be from 14 in. to 18 in. in length.

In step 220, a distortion modelled geometry is used to create the counter distortion webbing design having a cavity, which defines the injector throat. For example, CAM (computer-aided manufacturing) software can be used to determine the geometries of the engine case, fuel rail, and the counter distortion webbing design, which can be additively manufactured at a later stage. The distortion modelled geometry of the counter distortion webbing includes the cavity defining the injector throat with very stringent tolerance requirements and ensures the locational accuracy of the injector throat end.

In step 230, the determined engine case, fuel rail, and distortion webbing geometries are used to create a tool path for additively manufacturing the attritable engine with the counter distortion webbing. The tool path virtually builds layer-by-layer the counter distortion webbing on top of the outer wall of the engine case. The counter distortion webbing includes a cavity defining the injector throat high-tolerance geometry. For example, CAM software can be used to generate the tool path based on the determined geometries.

In a step 240, the determined tool path is used to additively manufacture the engine case and a fuel rail that is integral and conformal with the engine case. For example, the determined tool path can be used by a laser powder bed apparatus to build up the engine case in a layer-by-layer process, resulting in an engine case with an integrally built fuel rail. The counter distortion webbing of the fuel rail is precisely and accurately built such that the injector throat meets the high tolerance requirements of the attritable engine and no further processing of the injector throat is necessary.

Alternatively, after the engine case and the integral and conformal fuel rail has been additively manufactured, an access port can be added to the engine case. The access port allows line-of-sight access to the injector throat. The access port allows traditional machining tools access to the injector throat in order to perform secondary processing using traditional subtractive machining operations, such as, drilling, grinding, and polishing. These machining operations may be used to machine an injector throat that meets the stringent geometry requirements of the attritable engine. Once the geometry requirements of the injector throat are met, the access port is then closed. The access port can be closed by, for example, inserting a plug into the access port and spot welding the plug in place.

Additively manufacturing an attritable engine with an integrated fuel rail saves significant time and expense to the overall manufacturing process. Additive manufacturing reduces the number of parts needing to be assembled while maintaining many complex performance enhancing features as these features are built integrally with the engine case rather than added as separate parts during the assembly process.

Although an access port can be added to the engine case to allow line-of-sight access for traditional machining tools for secondary processing of the injector throat, the counter distortion webbing having a cavity defining the injector throat can also be built solely through additive manufacturing, which meets the stringent tolerance requirements of the attritable engine. These tight tolerance requirements are driven by the need to reduce static or slow moving fuel as it travels from the fuel ring into the spray zone within the combustion chamber. Static or slow moving fuel may promote coking, which can lead to increased greenhouse gas emissions and power loss.

Discussion of Possible Embodiments

The following are non-exclusive descriptions of possible embodiments of the present invention.

An attritable engine includes an engine case, which includes an outer wall and a fuel rail integral with the outer wall. The fuel rail includes a fuel line integral with the outer wall, a fuel ring configured to receive fuel from the fuel line, and an injector throat configured to receive aerated fuel from the fuel ring. The engine case includes counter distortion webbing defining the injector throat and is integral with the fuel rail and the outer wall. The engine case includes a combustion chamber configured to receive fuel from the injector throat.

The attritable engine of the preceding paragraph can optionally include, additionally and/or alternatively any one or more of the following features, configurations or additional components:

The engine case and fuel rail are formed of Inconel 625.

The fuel ring is configured to aerate the fuel.

The fuel ring forms a T-junction configured to aerate the fuel.

The engine case has a counter air flow design.

The engine is additively manufactured using a laser powder bed technique.

The engine is from 8 in. to 36 in. in length, inclusive.

The counter distortion webbing extends from the outer wall in an axial direction and toward the central rotor's rotational axis and has an approximate conical pyramid shape.

The engine includes an access port extending at an acute angle through outer wall 110, which is the same acute angle injector throat 126 extends from outer wall 110 and is located adjacent to the fuel ring and configured to allow secondary processing of the injector throat.

The secondary processing is selected from the group consisting of drilling, grinding, polishing, or combinations thereof.

A method of manufacturing an attritable engine includes defining an engine case and fuel rail geometry. The engine case includes an outer wall and a fuel rail integral with the outer wall. The fuel rail includes a fuel line integral with the outer wall, a fuel ring configured to receive fuel from the fuel line, and an injector throat configured to receive fuel from the fuel ring. The engine case includes a counter distortion webbing defining the injector throat and integral with the fuel rail and the outer wall and a combustion chamber configured to receive fuel from the injector throat. The method includes using a distortion modelled geometry to define the counter distortion webbing, using the engine case geometry, the fuel rail geometry, and the counter distortion webbing geometry to determine a tool path for additively manufacturing the engine case, and additively manufacturing the engine case with the counter distortion webbing, using the determined tool path.

The method of the preceding paragraph can optionally include, additionally and/or alternatively any, one or more of the following features, configurations and/or additional components:

The engine case and fuel rail are formed of Inconel 625.

The fuel ring is configured to aerate the fuel.

The fuel ring forms a T-junction configured to aerate the fuel.

The engine case has a counter air flow design.

The additive manufacturing is a laser powder bed technique.

The engine is from 8 in. to 36 in. in length, inclusive.

The engine case includes an access port extending at an acute angle through the outer wall, which is the same acute angle the injector throat extends from the outer wall and is located adjacent to the fuel ring and configured to allow secondary processing of the injector throat.

An attritable engine includes an engine case, which includes an outer wall and a fuel rail integral with the outer wall. The fuel rail includes a fuel line integral with the outer wall, a fuel ring configured to receive fuel from the fuel line, and an injector throat configured to receive aerated fuel from the fuel ring. The engine case includes counter distortion webbing defining the injector throat and is integral with the fuel rail and the outer wall. The engine case includes a combustion chamber configured to receive fuel from the injector throat. The engine case includes an access port located adjacent to the fuel ring and configured to allow secondary processing of the injector throat.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly for an engine, comprising:
    a liner extending circumferentially about an axis, a combustion chamber formed by and radially within a radial inner liner surface of the liner;
    an outer wall extending circumferentially about and spaced radially from the liner;
    a fuel line extending circumferentially within the outer wall;
    an injector throat fluidly coupled with the fuel line, the injector throat angularly offset from a radial inner wall surface of the outer wall by an acute angle in a radial plane with respect to the axis, the injector throat further angularly offset from the radial inner liner surface by the acute angle in the radial plane, the radial plane parallel with the axis, and the injector throat configured to direct fuel received from the fuel line into the combustion chamber through a throat outlet;

a webbing projecting radially inward from the outer wall towards the liner, the webbing forming the injector throat, and the webbing configured with a triangular cross-sectional geometry in the radial plane;

a compressor rotor comprising a plurality of compressor blades, the compressor rotor rotatable about the axis; and a turbine rotor comprising a plurality of turbine blades, the turbine rotor rotatable about the axis and disposed axially between the compressor rotor and the injector throat along the axis;

wherein the triangular cross-sectional geometry has a first side, a second side and a third side;

the first side is at the outer wall and extends along the axis;

the second side is adjacent and extends parallel to the injector throat;

the third side forms a distal side of the webbing exposed to a plenum radially between the outer wall and the liner; and the throat outlet is located on the third side and faces an opening in the liner, and the throat outlet is configured to inject the fuel into the plenum.

2. The assembly of claim 1, wherein the outer wall, the fuel line, the injector throat and the webbing are collectively formed by a monolithic body.

3. The assembly of claim 1, wherein the injector throat extends to the throat outlet in a direction along the axis towards the compressor rotor.

4. The assembly of claim 1, further comprising:
an airflow inlet to the engine at a forward end of the engine along the axis; and
an exhaust outlet from the engine at an aft end of the engine along the axis;
the injector throat extending longitudinally to the throat outlet in a forward direction towards the forward end of the engine.

5. The assembly of claim 1, wherein the liner extends circumferentially about the axis such that
a first portion of the liner is disposed to a first radial side of the axis; and
a second portion of the liner is disposed to a second radial side of the axis that is opposite the first radial side of the axis.

6. The assembly of claim 1, wherein
a first portion of the combustion chamber is disposed to a first radial side of the axis; and
a second portion of the combustion chamber is disposed to a second radial side of the axis that is opposite the first radial side of the axis.

7. The assembly of claim 1, wherein the fuel line is integral with the outer wall.

8. The assembly of claim 1, further comprising a fuel rail integral with the outer wall, the fuel rail comprising:
the fuel line;
a fuel ring configured to receive the fuel from the fuel line; and
the injector throat configured to receive the fuel from the fuel ring.

9. The assembly of claim 8, further comprising:
an access port disposed to a radial outer side of the outer wall;
the access port extending at an acute angle through the outer wall to the fuel ring.

10. An assembly for an engine, comprising:
a liner extending circumferentially about an axis, a combustion chamber formed by and radially within the liner, a first portion of the combustion chamber disposed to a first radial side of the axis, and a second portion of the combustion chamber disposed to a second radial side of the axis that is opposite the first radial side of the axis;
an outer wall extending circumferentially about and spaced radially from the liner;
a fuel line extending circumferentially within the outer wall;
an injector throat fluidly coupled with the fuel line, the injector throat angularly offset from a radial inner surface of the outer wall by an acute angle in a radial plane with respect to the axis, the injector throat configured to direct fuel received from the fuel line into the combustion chamber through a throat outlet;
a webbing projecting radially inward from the outer wall towards the liner, the webbing forming the injector throat, and the webbing configured with a triangular cross-sectional geometry in the radial plane; and
a compressor rotor comprising a plurality of compressor blades, the compressor rotor rotatable about the axis, wherein the injector throat extends to the throat outlet in a direction along the axis towards the compressor rotor;
wherein the triangular cross-sectional geometry has a first side, a second side and a third side;
the first side is at the outer wall and extends along the axis;
the second side is adjacent and extends parallel to the injector throat;
the third side forms a distal side of the webbing exposed to a plenum radially between the outer wall and the liner; and
the throat outlet is located on the third side and faces an opening in the liner, and the throat outlet is configured to inject the fuel into the opening in the liner through the plenum.

\* \* \* \* \*